United States Patent
Payne et al.

(10) Patent No.: US 9,978,033 B1
(45) Date of Patent: *May 22, 2018

(54) SYSTEM AND METHODS FOR SIMULATING HOME LOSS PREVENTION

(71) Applicant: STATE FARM MUTUAL AUTOMOBILE INSURANCE COMPANY, Bloomington, IL (US)

(72) Inventors: Kevin William Payne, Lexington, IL (US); Duane Lee Marzinzik, Springfield, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/691,476

(22) Filed: Aug. 30, 2017

Related U.S. Application Data

(63) Continuation of application No. 14/177,562, filed on Feb. 11, 2014, now Pat. No. 9,798,993.

(51) Int. Cl.
*G06Q 10/04* (2012.01)
*G06Q 50/00* (2012.01)
*G06Q 10/06* (2012.01)

(52) U.S. Cl.
CPC .................. *G06Q 10/067* (2013.01)

(58) Field of Classification Search
CPC .................................... G06Q 10/067
See application file for complete search history.

(56) References Cited

U.S. PATENT DOCUMENTS

| | | | |
|---|---|---|---|
| 8,126,747 B2 | 2/2012 | Vadiveloo | |
| 2003/0149657 A1 | 8/2003 | Reynolds et al. | |
| 2012/0004895 A1* | 1/2012 | Zhang | H04L 41/145 703/13 |
| 2013/0151012 A1 | 6/2013 | Shetty et al. | |
| 2013/0262040 A1* | 10/2013 | Buckley | G06F 17/5004 703/1 |

OTHER PUBLICATIONS

Cyryl Krzyska, "Smart House Simulation Tool," Informatics and Mathematical Modelling (IMM); Technical University of Denmark; pp. 1-55; 2006.*

* cited by examiner

*Primary Examiner* — Mark A Fleischer
(74) *Attorney, Agent, or Firm* — Marshall, Gerstein & Borun LLP; Randall G. Rueth

(57) ABSTRACT

A method and computer system executes a home loss prevention simulation to provide a user with information on home loss prevention. The method and system may allow the user to select and place one or more home sensors on items and/or in locations within a simulated home environment. Once the user has finished selecting and placing the home sensors in the simulated home, the method and system may begin the home loss prevention simulation by applying different loss-related simulation scenarios to the simulated home. Based the different loss-related scenarios, the method and system may evaluate the placement of the home sensors in the simulated home to determine one or more losses (e.g., fire, water or burglary) and any associated financial costs. At the end of the simulation, the method and system may provide instructional information regarding the simulation results in order to educate the user on how to improve or optimize home loss prevention.

20 Claims, 4 Drawing Sheets

SYSTEM AND METHODS FOR SIMULATING HOME LOSS PREVENTION

CROSS-REFERENCE TO RELATED APPLICATIONS

The present application is a continuation of U.S. patent application Ser. No. 14/177,562, filed Feb. 11, 2014, the disclosure of which is hereby fully incorporated by reference in its entirety.

TECHNICAL FIELD

The present application relates generally to home loss prevention and, more specifically, to systems and methods for simulating home sensors in a home for loss prevention purposes.

BACKGROUND

In home insurance, insurance providers generally seek to determine an insurance policy premium for a residence or home that is appropriate given the risk of losses (e.g., fire, water damage, theft, etc.) associated with the home. For purposes of making this determination, it is well understood that various features of the home can influence the probability that the home will experience a loss that is recognizable under the policy. For example, devices or sensors in the home (e.g., smoke detectors, burglar alarms, etc.) can detect and monitor threats to the home. As such, homes fitted with home sensors generally have a lower risk of loss, and therefore may be offered lower premiums for a given level of coverage. Conversely, homes without such sensors correspond to a higher risk of loss, and therefore may be offered higher premiums for the same level of coverage.

Currently, however, there is little information or mechanism available to aid individuals (e.g., current or potential insurance policy holders) in setting up their home sensors in order to optimize their home loss prevention. Consequently, many individuals are uncertain of whether or not to invest in home sensors, or how to deploy such sensors in their homes to obtain benefits, such as improving their home insurance coverage.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer-implemented method for simulating home loss prevention may include configuring, via one or more processors, a simulation model of a home environment. The simulation model of the home environment may include a plurality of rooms and each of the plurality of rooms includes a plurality of items. The method may also display, via one or more processors, the simulation model of the home environment and simulation models of one or more home sensors to a user. Further, the method may receive, via one or more processors, indications from the user regarding the placement of the simulation models of the one or more home sensors in the plurality of rooms or on the plurality of items in the simulation model of the home environment. The method may simulate, via one or more processors, the simulation model of the home environment by using one or more loss-related simulation scenarios. The method may then determine, via one or more processors, one or more losses in the simulation model of the home environment based on the one or more loss-related simulation scenarios and the placement of the simulation models of the one or more home sensors. Moreover, the method may provide, via one or more processors, feedback on the determined one or more losses in the simulation model of the home environment to the user.

A non-transitory computer-readable storage medium may comprise computer-readable instructions to be executed on one or more processors of a system for simulating home loss prevention. The instructions when executed, may cause the one or more processors to configure a simulation model of a home environment. The simulation model of the home environment may include a plurality of rooms and each of the plurality of rooms includes a plurality of items. The instructions when executed, may also cause the one or more processors to display the simulation model of the home environment and simulation models of one or more home sensors to a user. Further, the instructions when executed, may cause the one or more processors to receive indications from the user regarding the placement of the simulation models of the one or more home sensors in the plurality of rooms or on the plurality of items in the simulation model of the home environment. The instructions when executed, may cause the one or more processors to simulate the simulation model of the home environment by using one or more loss-related simulation scenarios. The instructions when executed, may then cause the one or more processors to determine one or more losses in the simulation model of the home environment based on the one or more loss-related simulation scenarios and the placement of the simulation models of the one or more home sensors. Moreover, the instructions when executed, may cause the one or more processors to provide feedback on the determined one or more losses in the simulation model of the home environment to the user.

A computer system for simulating home loss prevention may comprise a simulation database and a simulation server that includes a memory having instructions for execution on one or more processors. The instructions when executed by the one or more processors, may cause the simulation server to retrieve, via a network connection, a simulation model of a home environment from the simulation database and configure the simulation model of the home environment. The simulation model of the home environment may include a plurality of rooms and each of the plurality of rooms includes a plurality of items. The instructions when executed by the one or more processors, may also retrieve, via a network connection, simulation models of one or more home sensors from the simulation database, and display, via a network connection, the simulation model of the home environment and the simulation models of the one or more home sensors to a user. The instructions when executed by the one or more processors, may further receive, via a network connection, indications from the user regarding the placement of the simulation models of the one or more home sensors in the plurality of rooms or on the plurality of items in the simulation model of the home environment. Moreover, the instructions when executed by the one or more processors, may retrieve, via a network connection, one or more loss-related simulation scenarios from the simulation database. The instructions when executed by the one or more processors, may then simulate the simulation model of the home environment by using the one or more loss-related simulation scenarios, and determine one or more losses in the simulation model of the home environment based on the one or more loss-related simulation scenarios and the placement of the simulation models of the one or more home sensors. Finally, the instructions when executed by the one or more processors, may provide, via a network connection, feedback on the determined one or more losses in the simulation model of the home environment to the user.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Generally speaking, the disclosed system performs simulation of one or more sensors in a home (generally referred to herein as "home sensors") to provide a user with home loss prevention information. As used herein, "home" refers to a residential property that the user may own, rent, lease, etc.

Figure 1:
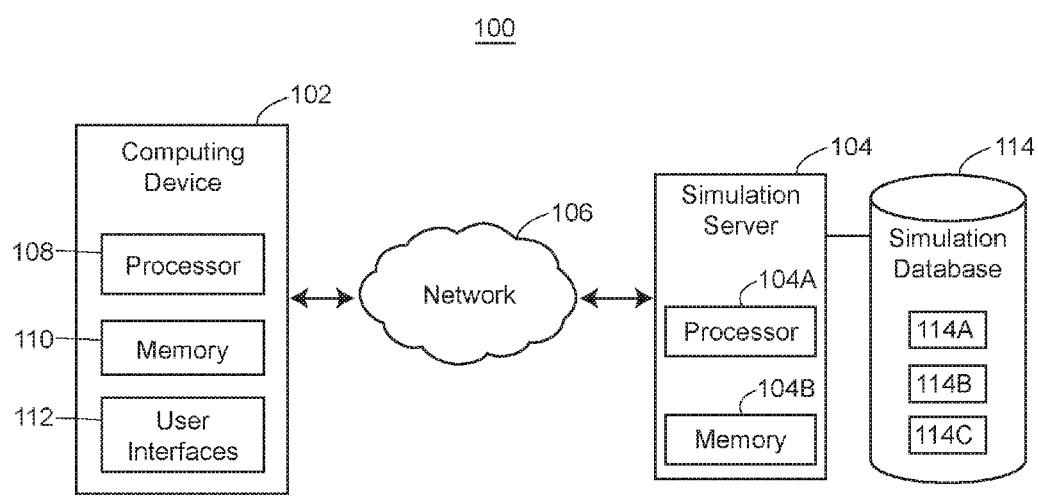
FIG. 1 is a block diagram of an example system for simulating home sensors in a home for loss prevention purposes.

Referring first to FIG. 1, which is a block diagram of an example system 100 for simulating home sensors in a home for loss prevention purposes. The example system 100 includes a computing device 102 that is communicatively coupled to a simulation server 104 via a network 106 (e.g., a local area network, a wide area network, a mobile network, a wired or wireless network, a private network, etc.). The computing device 102 includes a processor 108, a memory 110, and user interfaces 112 (e.g., a display screen, a touchscreen, a keyboard, etc.). In general, the computing device 102 may be a personal computer, a smart phone, a tablet computer, etc.

The simulation server 104 may be a single server or a plurality of servers with distributed processing. A simulation database 114 may be directly coupled to the simulation server 104. In some embodiments, the simulation database 114 may not be directly coupled to the simulation server 104, but instead may be accessible by the server 104 via a network such as the network 106. The simulation database 114 may include a variety of simulation data such as home sensor simulation data 114A, home environment simulation data 114B, and home loss simulation data 114C.

The home sensor simulation data 114A may include simulation models for various types of home sensors such as fire or smoke detectors, carbon monoxide detectors, water sensors (e.g., to detect a water leak), door/window entry alarms, motion detectors, cameras, glass break sensors, door lock sensors, energy monitors, temperature sensors, etc. The home sensor simulation data 114A may also include simulation models for a group of home sensors that form a home-centered system. For example, the home sensor simulation data 114A may define a home automation and monitoring system that includes one or more smoke detectors, water sensors, door/window entry alarms, energy monitors, etc. As another example, the home sensor simulation data 114A may define a home security system that includes one or more cameras, motion detectors, glass break sensors, etc.

The home environment simulation data 114B may include simulation models for various types of homes. For example, the home environment simulation data 114B may define a simulation model for a house including the number and location of rooms (e.g., living room, kitchen, basement, etc.) within the house. Further, the home environment simulation data 114B may specify various items that may be included or placed in each room of the house such as doors and windows, appliances (e.g., refrigerator, washing machine, stove, etc.), plumbing fixtures (e.g., toilet, bathtub, sink, etc.), heating and ventilation units (e.g., fireplace, furnace, air conditioning unit, etc.), and other major household items (e.g., electronics, furniture, etc.).

In some embodiments, the simulation server 104 may enable a user to modify the home sensor simulation data 114A and/or the home environment simulation data 114B. For example, the user may add a simulation model for a new type of home sensor or home-centered system to be saved as part of the home sensor simulation data 114A. Similarly, the user may add a simulation model for a new type of home, or configure an existing simulation model to be saved as part of the home environment simulation data 114B.

The home loss simulation data 114C may include simulation models or scenarios for various types of losses that may occur in a home or residence. Typically, there are three types of losses: fire, water, and burglary. The occurrence of these losses may result in damages to the home. For example, a fire may cause fire damage to a portion of the home. In another example, a water leak may cause water damage to certain rooms in the home. In a further example, a break-in at the home may result in widespread property damage and theft. In all of these scenarios, the incurred damage entails a certain amount of financial loss. As such, the home loss simulation data 114C may specify loss-related scenarios for each type of loss, including the likelihood that each scenario will occur and the financial cost associated with each scenario. This set of information may be based on historical or actual loss data gathered from an insurance provider. In an example embodiment, the simulation server 104 may communicate with an insurance provider, via the network 106, to access insurance claims on the various types of losses, and/or derive information from established probability loss tables. The simulation server 104 may then process the gathered information to be stored as the home loss simulation data 114C in the database 114.

In some embodiments, each of the simulation data 114A-114C may be stored in separate databases directly coupled to the server 104, or alternatively, each of the simulation data 114A-114C may be stored in separate databases accessible by the server 104 via a network such as the network 106.

The simulation server 104 may operate directly on the simulation data 114A-114C provided in the database 114, or may operate on other data that is generated based on the simulation data 114A-114C from the database 114. For example, the simulation server 114 may convert the simulation data 114A-114C in the database 114 to a particular format (e.g., for efficient storage), and later utilize the modified data to carry out simulations.

With continued reference to FIG. 1, a processor 104A of the simulation server 104 may execute instructions stored in a memory 104B of the simulation server 104 to perform simulation of one or more home sensors in a home for loss prevention purposes. The simulation server 104 may begin a home loss prevention simulation by configuring a simulated home. To do so, the server 104 may access the home environment simulation data 114B in the database 114 to retrieve a standard simulation model for a home (e.g., a house). In an embodiment, the server 104 may allow a user to indicate which simulation model to retrieve from a master list of simulation models, and to edit or modify the retrieved simulation model based on the user's preference (e.g., create a new room, add or remove household items, etc.).

Once the simulated home is configured, the simulation server 104 may display the simulated home to the user. For example, the server 104 may display, via the network 106, the simulated home on the user interfaces 112 (e.g., a display screen) of the computing device 102. The simulation server 104 may then allow the user to choose and place any number of home sensors and/or home-centered systems in the simulated home. To accomplish this, the server 104 may access the home sensor simulation data 114A in the database 114 to retrieve and display the simulation models for the various types of home sensors and/or home-centered systems.

The user may select and place specific sensors on items and/or in locations within the simulated home (e.g., through the use of drag and drop operations via the user interfaces 112 of the computing device 102). Alternatively or additionally, the user may select and place specific home-centered systems in the simulated home. After the user has finished selecting and placing all the home sensors and/or home-centered systems in the simulated home, the server 104 may commence the home loss prevention simulation. In particular, the server 104 may access the home loss simulation data 114C in the database 114 to retrieve and apply different loss-related scenarios to the simulated home. Based on the different loss-related scenarios, the server 104 may evaluate the placement of the home sensors and/or home-centered systems in the simulated home to determine the possibility of losses and any associated financial costs.

To illustrate the above concept, consider an example in which the user has placed one or more door/window entry alarms in the living room of a simulated model house in an effort to prevent burglary loss. However, the user has not placed any entry alarms in the den of the simulated house. From the home loss simulation data 114C, the server 104 may establish a burglary loss is likely to occur in the living room, but there is also a high probability of a burglary loss occurring in the den. Accordingly, the server 104 may simulate a scenario in which a burglary event occurs in the living room and the den. However, because the user did not place a door/window entry alarm in the den, the simulation produces a burglary loss in the den and an associated financial cost. For example, the server 104 may simulate the theft of a computer in the den and indicate the cost to replace the stolen computer. After the simulation ends, the server 104 may provide instructional information to inform or educate the user on the result of the simulation. For example, the server 104 may notify the user (e.g., in a message at the end of the simulation) that a door/window entry alarm placed in the den would have improved or provided better protection against burglary loss.

In some embodiments, the computing device 102 may be configured to carry out simulations. In this case, the processor 108 may execute instructions stored in the memory 110 to access the data 114A-114C via the network 106, and perform simulation of one or more home sensors in a home for loss prevention purposes.

Figure 2:
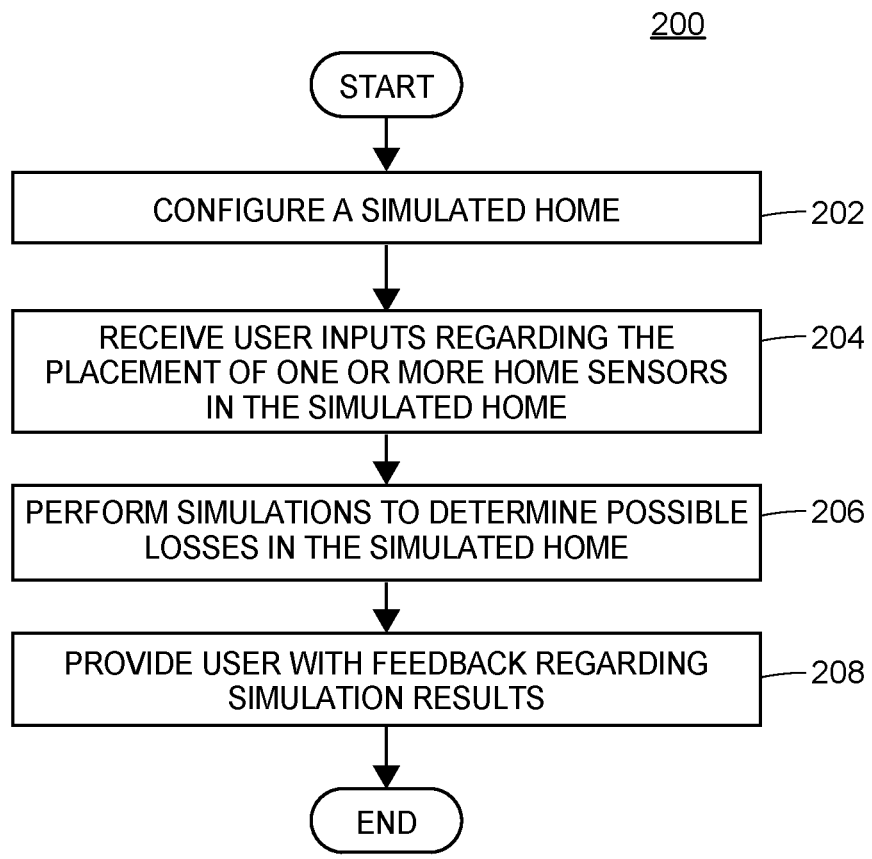
FIG. 2 is a flow diagram of an example method for simulating home sensors in a home for loss prevention purposes.

Referring now to FIG. 2, which describes a flow diagram of an example method 200 for simulating home sensors in a home for loss prevention purposes. The method 200 may include one or more blocks, routines or functions in the form of computer executable instructions that are stored in a tangible computer-readable medium (e.g., 104B of FIG. 1) and executed using a processor (e.g., 104A of FIG. 1).

The method 200 begins by configuring a simulated home (block 202). In an embodiment, the method 200 may retrieve a standard simulation model for a home (e.g., by accessing the data 114B in the database 114 of FIG. 1) to use as the simulated home. Alternatively or additionally, the method 200 may enable the user to choose a simulation model to use. For example, the user may select a desired or preferred simulation model from a master list of simulation models. Each simulation model in the master list may have a different configuration, such as having a different number of rooms, floors, household items, etc.

In general, the simulated home may depict the interior plan of a model home such as a house or an apartment unit. In an embodiment, the simulated home shows the side-view of a multi-story house including various floors and rooms. Further, the simulated house may show a range of items that may be included or placed inside each room of the house (e.g., doors and windows, furniture, appliances, plumbing fixtures, etc.).

The method 200 may also provide instructional information (e.g., tutorials) that inform or educate the user on how the simulated home operates and how to proceed with the home loss prevention simulation. In some embodiments, the method 200 may allow the user to configure the simulated home before the simulation begins. For example, the user may edit the number of rooms in the house, rearrange items in the house, delete items, etc. Moreover, the method 200 may display the simulated home to the user for viewing and interaction during the simulation (e.g., via the user interfaces 112 of FIG. 1).

Next, the method 200 receives inputs from the user regarding the placement of one or more home sensors in the simulated home (block 204). Alternatively or additionally, the method 200 may receive inputs from the user regarding the placement of one or more home-centered systems in the simulated home. In any event, the method 200 may retrieve and display simulation models for various types of home sensors and/or home-centered systems to the user (e.g., by accessing the data 114A in the database 114 and displaying via the user interfaces 112 of FIG. 1). The method 200 may also provide instructional information to inform or educate the user on the functionality and performance of each type of home sensor and/or home-centered system.

The method 200 then allows the user to select and place specific home sensors and/or home-centered systems in the simulated home. For example, the user may select and place a smoke detector in the kitchen of the simulated home, or on an item (e.g., a fireplace) in the simulated home. As another example, the user may select and place a home security system in the simulated home. This may involve placing multiple numbers and types of home sensors (e.g., door/window entry alarms, motion detectors, cameras, etc.) in various rooms or on various items in the simulated home. In some embodiments, the user can also choose to place home sensors and/or home-centered systems in the simulated home for a particular purpose (e.g., to prevent fire loss or any other type of loss). To this end, method 200 may provide additional information to help and educate the user in choosing and strategically placing the home sensors and/or home-centered systems within the simulated home to satisfy the particular purpose (e.g., to maximize protection against a type of loss).

Figure 3:
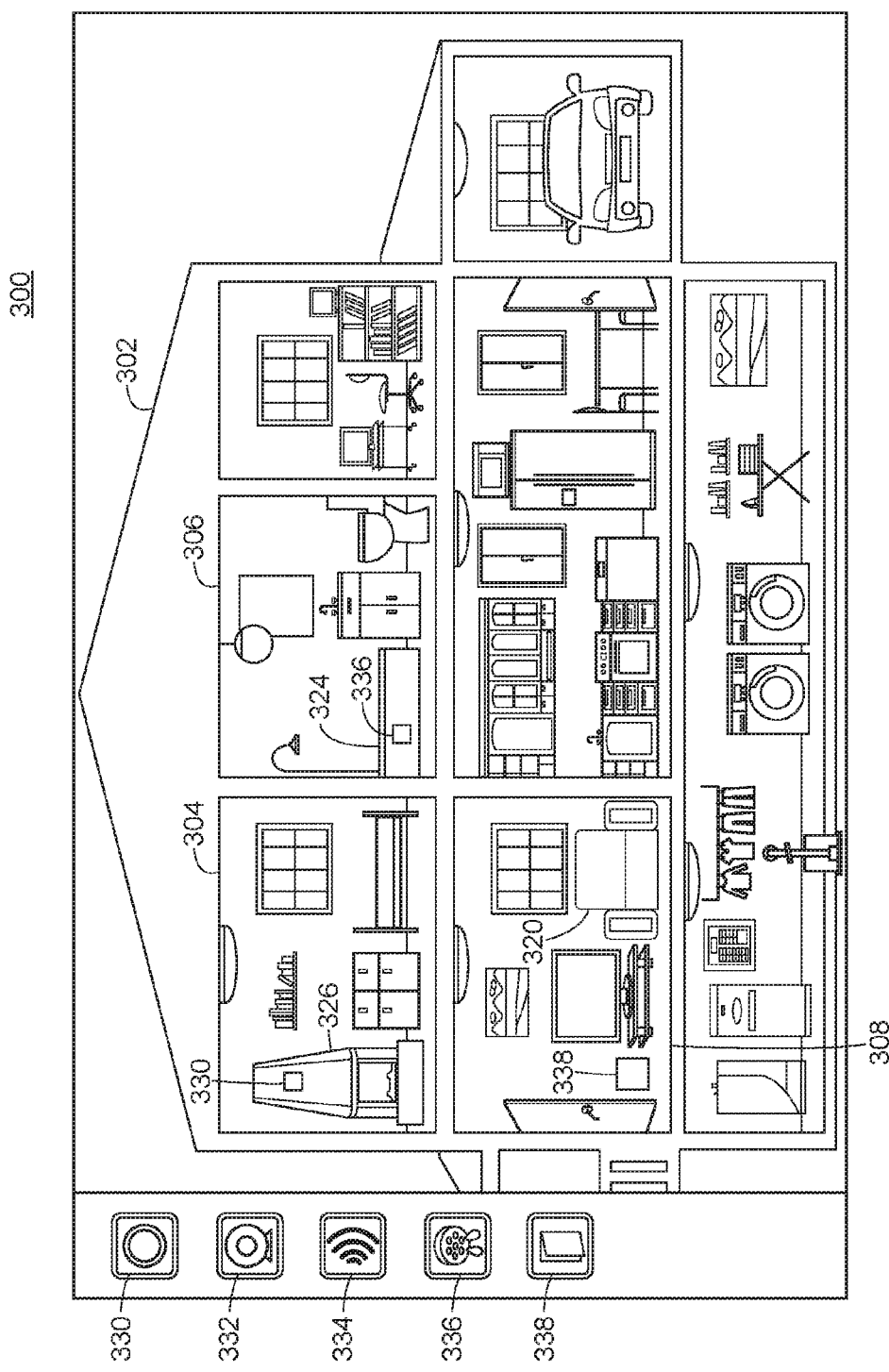
FIG. 3 is a screenshot of an example simulation of home sensors in a home for loss prevention purposes.

To illustrate the steps in blocks 202 and 204, consider FIG. 3, which shows a screenshot of an example simulation 300. The simulation 300 depicts a simulated house 302 including various rooms such as a bedroom 304, a bathroom 306, and a living room 308. Each of the rooms 304-308 also includes various items such as furniture (e.g., a sofa 320), plumbing fixtures (e.g., a bathtub 324), and heating and ventilation units (e.g., a fireplace 326).

Moreover, the simulation 300 depicts various types of home sensors for the simulated house 302 including smoke detectors 330, cameras 332, motion detectors 334, water sensors 336, and door entry alarms 338. A user may select and place one or more of the home sensors 330-338 in the simulated house 302 to prevent various types of losses. For example, as shown in FIG. 3, the user has selected and placed a smoke detector 330 on the fireplace 326 in an effort to prevent fire loss. Further, the user has selected and placed a water sensor 336 on the bathtub 324 in an effort to prevent water loss. Still further, the user has selected and placed a door entry alarm 338 in the living room 308 in an effort to prevent burglary loss.

Returning to FIG. 2, once the user has completed the selection and placement of the home sensors and/or home-centered systems, the method 200 proceeds to perform simulations to determine possible losses in the simulated home (block 206). More particularly, the method 200 may apply various loss-related scenarios to the simulated home (e.g., by accessing the data 114C in the database 114 of FIG. 1), and determine the possibility of losses by evaluating the placement of the home sensors and/or home-centered systems. In an example simulation, the method 200 may simulate a scenario involving water loss. In this scenario, the method 200 may establish that water loss is likely or more likely to occur in rooms (e.g., bathroom, basement, etc.) and items (e.g., washing machine, sink, etc.) associated with water usage. Thus, the method 200 may simulate a water loss event in those rooms or items. If the user has placed the water sensors in the correct rooms and on the correct items, then the method 200 may determine from the simulation that a water loss has been prevented. However, if the user has not placed the water sensors correctly or has neglected to place the water sensors in certain rooms or on certain items, then the method 200 may determine from the simulation that a water loss has occurred. The method 200 may also indicate the financial costs associated with the water loss. For example, the method 200 may indicate the cost to repair a water damaged room, or replace a water damaged item.

The method 200 may perform multiple simulations with each simulation involving a different type of loss. In some embodiments, the method 200 may allow the user to select and place home sensors and/or home-centered systems in the simulated home each time before the method 200 executes a simulation involving a different type of loss. Here, the method 200 may also allow the user to reset the simulated home (e.g., remove all previously placed home sensors and/or home-centered systems) before the start of each simulation. In other embodiments, the method 200 may allow the user to select and place home sensors and/or home-centered systems in the simulated home, and then continuously perform a series of simulations involving different types of losses. The method 200 may also set up a timeline for the series of simulations to occur. For example, the method 200 may set up a three-year time cycle, in which the method 200 performs a simulation involving fire loss in the first year, followed by simulations involving water loss and burglary loss in the second and third year.

Alternatively or additionally, the method 200 may perform the series of simulations by adjusting the severity of the different types of losses in order to increase the difficulty of the simulations. For example, the method 200 may perform an easy first simulation involving a small fire loss (e.g., a fire loss event in an obvious room of the simulated home that is prone to fire loss such as the kitchen). If the user has placed a home sensor (e.g., a smoke detector) in the affected room, then the small fire loss may be prevented. To continue, the method 200 may perform a more difficult second simulation involving a large fire loss (e.g., a fire loss event covering multiple rooms and/or multiple items in the simulated home). If the user has placed home sensors in all of the affected rooms and/or on all of the affected items, then the large fire loss may also be prevented. However, if the user did not or neglected to place all of the required home sensors, then the method 200 may determine that the simulated home has incurred a large fire loss and may then proceed to indicate the financial costs associated with the large fire loss.

After all the simulations are complete, the method 200 provides the user with feedback regarding the simulation results (block 208). Here, the method 200 may display instructional information to inform or educate the user on why a particular loss occurred and how to prevent that loss from occurring in the future or in the first place. For example, the method 200 may teach the user to place particular home sensors and/or home-centered systems in certain rooms and/or on certain items in the simulated home in order to optimize the prevention of various types of losses.

In some embodiments, the method 200 may provide a rating system to evaluate the simulation results. As an example, the method 200 may accumulate scores (e.g., points, badges, trophies, icons, etc.) for each simulation. Successful simulations (e.g., losses prevented) will earn positive scores, while unsuccessful simulations (e.g., losses incurred) will earn negative scores. At the end of all the simulations, the method 200 may count the scores to provide the user with a final rating on the simulation results. In other embodiments, the method 200 may keep track of the financial costs, if any, incurred during each simulation. At the end of all the simulations, the method 200 may calculate a total amount of the financial costs, and assign a final rating based on whether the total amount is large or small.

Alternatively or additionally, the method 200 may provide a rating system to evaluate how well the user performed in placing the home sensors and/or the home-centered systems in the simulated home. This provides another manner to evaluate and understand the significance of the simulation results. For example, the method 200 may determine that in order to optimize the prevention of water loss, there are ten locations, including items, in the simulated home that require a home sensor (e.g., a water sensor). If the user has placed a home sensor in all ten locations, then the method 200 may determine that the user has successfully optimized the prevention of water loss in the simulated home. Accordingly, after a successful simulation, the method 200 may provide a final rating showing the optimization of water loss prevention which led to the successful simulation. On the other hand, if the user did not correctly place all of the required home sensors, then the method 200 may determine that the user has not optimized the prevention of water loss. Accordingly, after an unsuccessful simulation, the method 200 may provide a final rating showing a lack of optimization for water loss prevention which led to the unsuccessful simulation.

Moreover, the method 200 may use the final rating on the simulation results to offer the user benefits in the form of goods or services (or indications of goods or services). For example, based on the final rating, the method 200 may offer the user: coupons, adjusted insurance premiums, discounts on products and services, etc. These offers may be communicated and displayed to the user via the user interfaces 112 of FIG. 1, for example.

Figure 4:
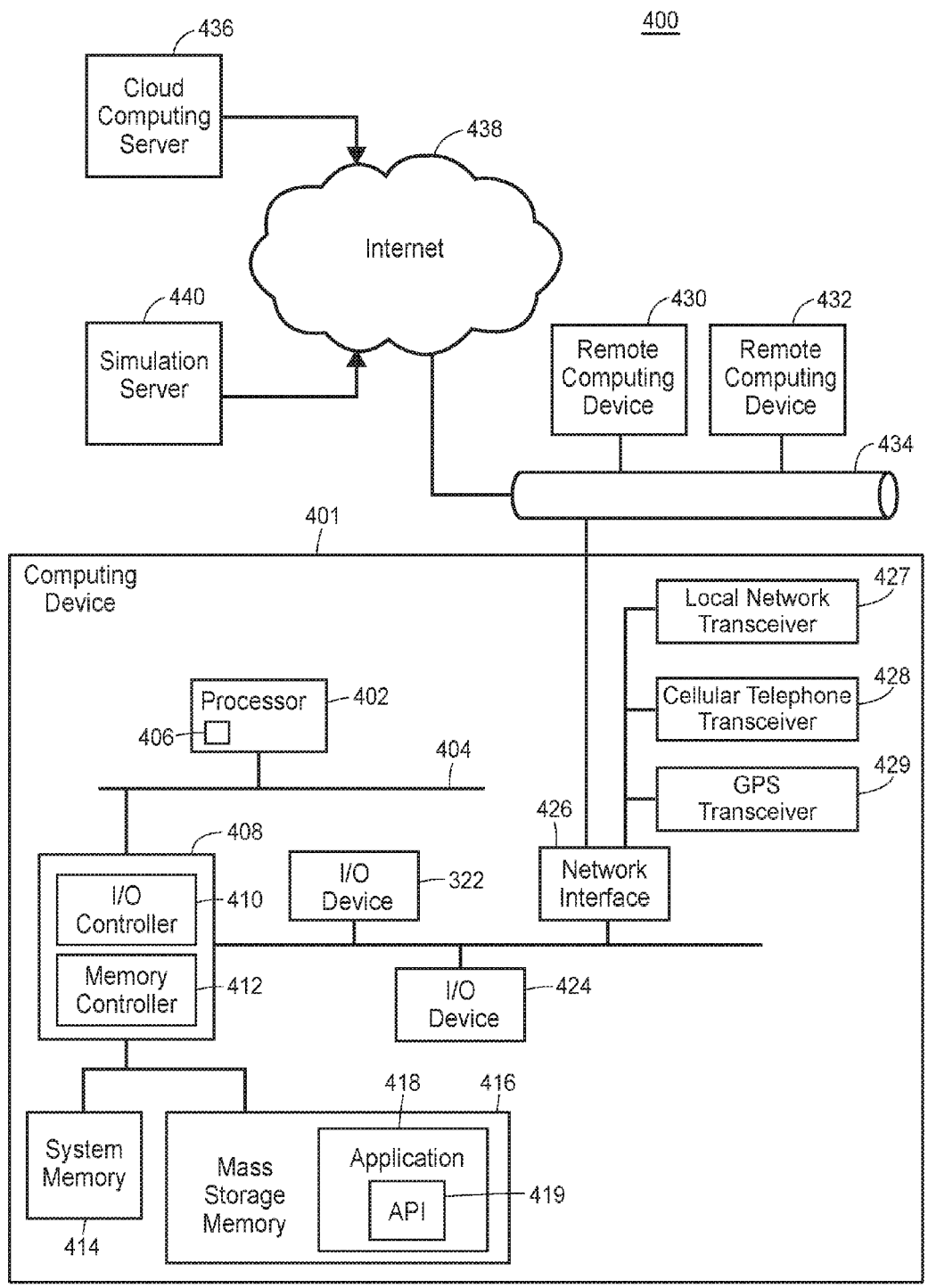
FIG. 4 is a block diagram of a computing environment that implements a system and method for simulating home sensors in a home for loss prevention purposes.

FIG. 4 is a block diagram of an example computing environment for a system 400 having a computing device 401 that may be used to implement the systems and methods described herein. The computing device 401 may include a simulation server 104, a mobile computing device (e.g., cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example system 400 may be used to implement and execute the example system of FIG. 1, the method of FIG. 2, and the like. Although the example insurance system 400 is described below as including a plurality of peripherals, interfaces, chips, memories, etc., one or more of those elements may be omitted from other example processor systems used to implement and execute the example system 100. Also, other components may be added.

As shown in FIG. 4, the computing device 401 includes a processor 402 that is coupled to an interconnection bus 404. The processor 402 includes a register set or register space 406, which is depicted in FIG. 4 as being entirely on-chip, but which could alternatively be located entirely or partially off-chip and directly coupled to the processor 402 via dedicated electrical connections and/or via the interconnection bus 404. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus 404.

The processor 402 of FIG. 4 is coupled to a chipset 408, which includes a memory controller 410 and a peripheral input/output (I/O) controller 412. As is well known, a chipset typically provides I/O and memory management functions as well as a plurality of general purpose and/or special purpose registers, timers, etc. that are accessible or used by one or more processors coupled to the chipset 408. The memory controller 410 performs functions that enable the processor 402 (or processors if there are multiple processors) to access a system memory 414 and a mass storage memory 416, that may include either or both of an in-memory cache (e.g., a cache within the memory 414) or an on-disk cache (e.g., a cache within the mass storage memory 416).

The system memory 414 may include any desired type of volatile and/or non-volatile memory such as, for example, static random access memory (SRAM), dynamic random access memory (DRAM), flash memory, read-only memory (ROM), etc. The mass storage memory 416 may include any desired type of mass storage device. For example, if the computing device 401 is used to implement an application 418 having an API 419 (including functions and instructions as described by the method 200 of FIG. 2). The mass storage memory 416 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401 and the insurance system 400. Thus, a module, block, function, operation, procedure, routine, step, and method can be implemented in hardware, firmware, and/or software. In one embodiment, program modules and routines (e.g., the application 418, the API 419, etc.) are stored in mass storage memory 416, loaded into system memory 414, and executed by a processor 402 or can be provided from computer program products that are stored in tangible computer-readable storage mediums (e.g., RAM, hard disk, optical/magnetic media, etc.).

The peripheral I/O controller 410 performs functions that enable the processor 402 to communicate with peripheral input/output (I/O) devices 422 and 424, a network interface 426, a local network transceiver 427, a cellular network transceiver 428, and a GPS transceiver 429 via the network interface 426. The I/O devices 422 and 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The cellular telephone transceiver 428 may be resident with the local network transceiver 427. The local network transceiver 427 may include support for a Wi-Fi network, Bluetooth, Infrared, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 412 and the I/O controller 410 are depicted in FIG. 4 as separate functional blocks within the chipset 408, the functions performed by these blocks may be integrated within a single integrated circuit or may be implemented using two or more separate integrated circuits. The system 400 may also implement the application 418 on remote computing devices 430 and 432. The remote computing devices 430 and 432 may communicate with the computing device 401 over an Ethernet link 434. In some embodiments, the application 418 may be retrieved by the computing device 401 from a cloud computing server 436 via the Internet 438. When using the cloud computing server 436, the retrieved application 418 may be programmatically linked with the computing device 401. The application 418 may be a Java® applet executing within a Java® Virtual Machine (JVM) environment resident in the computing device 401 or the remote computing devices 430, 432. The application 418 may also be "plug-ins" adapted to execute in a web-browser located on the computing devices 401, 430, and 432. Further, the application 418 may be adapted to execute in a web-browser using JavaScript. In some embodiments, the application 418 may communicate with a back-end component 440 such as the simulation server 104 via the Internet 438.

The system 400 may include but is not limited to any combination of a LAN, a MAN, a WAN, a mobile, a wired or wireless network, a private network, or a virtual private network. Moreover, while only two remote computing devices 430 and 432 are illustrated in FIG. 4 to simplify and clarify the description, it is understood that any number of client computers are supported and can be in communication within the system 400.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for simulating home sensors in a home for loss prevention purposes for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for simulating home sensors in a home through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for simulating home loss prevention using a simulation model of a home environment, the simulation model including an interior plan depicting a plurality of rooms, the method comprising:
displaying, in a user interface, (i) at least a portion the simulation model of the home environment, and (ii) a set of depictions of a set of home sensors;
receiving, by a processor via the user interface, a set of inputs regarding placement of at least a portion of the set of home sensors in at least a portion of the plurality of rooms;
accessing a set of loss-related scenarios based on information derived from loss data;
based on the placement of at least the portion of set of home sensors, performing, by the processor, a home loss simulation by applying the set of loss-related scenarios to the simulation model of the home environment in order to determine a set of losses in the home environment, the set of losses specifying a set of damages that can occur in the home environment including one or more of fire damages, water damages, and theft damages; and
displaying, in the user interface, feedback on how to prevent the set of losses in the home environment.

2. The computer-implemented method of claim 1, wherein performing the home loss simulation by applying the set of loss-related scenarios to the simulation model of the home environment comprises:
determining a likelihood that each of the set of losses will occur in the home environment.

3. The computer-implemented method of claim 1, wherein performing the home loss simulation by applying the set of loss-related scenarios to the simulation model of the home environment comprises:
determining a financial cost associated with each of the set of losses.

4. The computer-implemented method of claim 1, wherein displaying feedback on how to prevent the set of losses in the home environment comprises:
displaying instructional information associated with the placement of at least the portion of the set of home sensors.

5. The computer-implemented method of claim 1, further comprising:
calculating a rating score based on the set of losses.

6. The computer-implemented method of claim 5, wherein displaying feedback on how to prevent the set of losses in the home environment comprises:
displaying a set of benefits based on the rating score, wherein the set of benefits includes at least one of: an adjusted insurance premium and a discount.

7. The computer-implemented method of claim 1, wherein the home loss simulation has a difficulty level, and wherein the method further comprises:
based on the placement of at least the portion of set of home sensors, performing, by the processor, an additional home loss simulation having an additional difficulty level by applying the set of loss-related scenarios to the simulation model of the home environment.

8. A system for simulating home loss prevention using a simulation model of a home environment, the simulation model including an interior plan depicting a plurality of rooms, the system comprising:
a user interface;
a memory storing at least a set of instructions; and
a processor interfacing with the user interface and the memory, and configured to execute the set of instructions to cause the processor to:
cause the user interface to display (i) at least a portion the simulation model of the home environment, and (ii) a set of depictions of a set of home sensors,
receive, via the user interface, a set of inputs regarding placement of at least a portion of the set of home sensors in at least a portion of the plurality of rooms,
access, from the memory, a set of loss-related scenarios based on information derived from loss data, based on the placement of at least the portion of set of home sensors, perform a home loss simulation by applying the set of loss-related scenarios to the simulation model of the home environment in order to determine a set of losses in the home environment, the set of losses specifying a set of damages that can occur in the home environment including one or more of fire damages, water damages, and theft damages, and cause the user interface to display feedback on how to prevent the set of losses in the home environment.

9. The system of claim 8, wherein to perform the home loss simulation by applying the set of loss-related scenarios to the simulation model of the home environment, the processor is configured to:

determine a likelihood that each of the set of losses will occur in the home environment.

10. The system of claim 8, wherein to perform the home loss simulation by applying the set of loss-related scenarios to the simulation model of the home environment, the processor is configured to:

determine a financial cost associated with each of the set of losses.

11. The system of claim 8, wherein to cause the user interface to display feedback on how to prevent the set of losses in the home environment, the processor is configured to:

cause the user interface to display instructional information associated with the placement of at least the portion of the set of home sensors.

12. The system of claim 8, wherein the processor is configured to execute the set of instructions to further cause the processor to:

calculate a rating score based on the set of losses.

13. The system of claim 12, wherein to cause the user interface to display feedback on how to prevent the set of losses in the home environment, the processor is configured to:

cause the user interface to display a set of benefits based on the rating score, wherein the set of benefits includes at least one of: an adjusted insurance premium and a discount.

14. The system of claim 8, wherein the home loss simulation has a difficulty level, and wherein the processor is configured to execute the set of instructions to further cause the processor to:

based on the placement of at least the portion of set of home sensors, perform an additional home loss simulation having an additional difficulty level by applying the set of loss-related scenarios to the simulation model of the home environment.

15. A non-transitory computer-readable storage medium including computer-readable instructions to be executed on one or more processors of a system for simulating home loss prevention using a simulation model of a home environment, the simulation model including an interior plan depicting a plurality of rooms, the instructions when executed causing the one or more processors to:

display, in a user interface, (i) at least a portion the simulation model of the home environment, and (ii) a set of depictions of a set of home sensors;

receive, via the user interface, a set of inputs regarding placement of at least a portion of the set of home sensors in at least a portion of the plurality of rooms;

access a set of loss-related scenarios based on information derived from loss data;

based on the placement of at least the portion of set of home sensors, perform a home loss simulation by applying the set of loss-related scenarios to the simulation model of the home environment in order to determine a set of losses in the home environment, the set of losses specifying a set of damages that can occur in the home environment including one or more of fire damages, water damages, and theft damages; and display, in the user interface, feedback on how to prevent the set of losses in the home environment.

16. The non-transitory computer-readable storage medium of claim 15, wherein the instructions to perform the home loss simulation by applying the set of loss-related scenarios to the simulation model of the home environment cause the one or more processors to:

determine a likelihood that each of the set of losses will occur in the home environment.

17. The non-transitory computer-readable storage medium of claim 15, wherein the instructions to perform the home loss simulation by applying the set of loss-related scenarios to the simulation model of the home environment cause the one or more processors to:

determine a financial cost associated with each of the set of losses.

18. The non-transitory computer-readable storage medium of claim 15, wherein the instructions to display feedback on how to prevent the set of losses in the home environment cause the one or more processors to:

display instructional information associated with the placement of at least the portion of the set of home sensors.

19. The non-transitory computer-readable storage medium of claim 15, wherein the instructions when executed further cause the one or more processors to:

calculate a rating score based on the set of losses.

20. The non-transitory computer-readable storage medium of claim 19, wherein the instructions to display feedback on how to prevent the set of losses in the home environment cause the one or more processors to:

display a set of benefits based on the rating score, wherein the set of benefits includes at least one of: an adjusted insurance premium and a discount.

* * * * *